(No Model.)
E. & B. HOLMES.
COMBINED CART AND SUGAR CANE PLANTER.
No. 347,800. Patented Aug. 24, 1886.
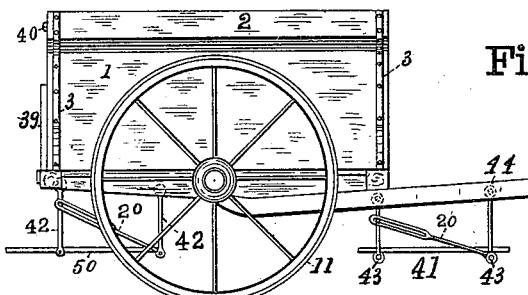
Fig. 1.
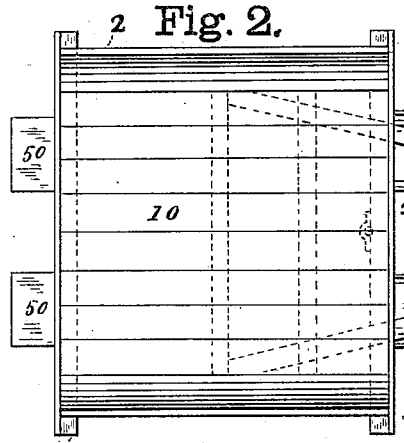
Fig. 2.
Fig. 3.
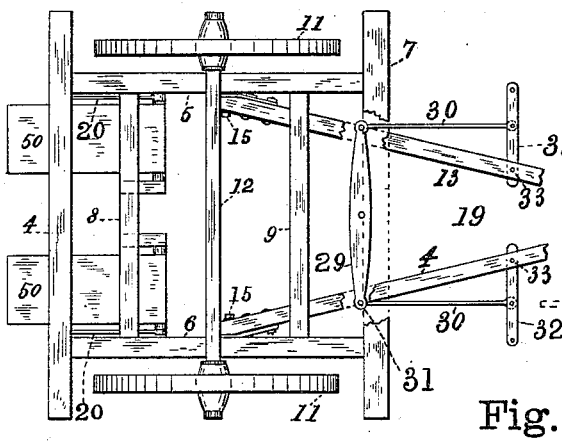
Fig. 4.
Fig. 5.
Fig. 6.
Witnesses.
A. J. Sangster
Jennie M. Caldwell
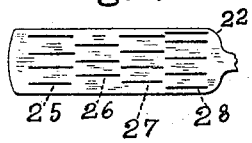
Fig. 7.
Inventors.
Edward Holmes
Britain Holmes
By James Sangster
Atty.
N. PETERS, Photo-Lithographer, Washington, D. C.

UNITED STATES PATENT OFFICE.

EDWARD HOLMES AND BRITAIN HOLMES, OF BUFFALO, NEW YORK.

COMBINED CART AND SUGAR-CANE PLANTER.

SPECIFICATION forming part of Letters Patent No. 347,800, dated August 24, 1886.

Application filed May 6, 1886. Serial No. 201,266. (No model.)

*To all whom it may concern:*

Be it known that we, EDWARD HOLMES and BRITAIN HOLMES, citizens of the United States, residing in Buffalo, in the county of Erie and State of New York, have invented certain new and useful Improvements in a Combined Cart and Sugar-Cane Planter, of which the following is a specification.

The object of our invention is to produce a vehicle or cart that will answer or supply the wants of the sugar-cane growers, first, as a complete dumping-cart for drawing the cane from the field; second, as a cane carrying and dropping machine.

This very important part of our invention consists in combining with the cart platforms upon which the operators stand or sit, an open frame through which the cane can be dropped by the operator into a furrow as required for planting, which open frame is constructed so as to answer also for the tongue of the cart, its front end being supported in any of the different ways that ordinary cart-tongues are supported by the animals drawing it.

Our invention further consists in combining with a cane-carrying cart a rear platform or platforms, on which men can stand or sit while removing the cane by hand from the cart and placing the same in the furrow as required for planting cane.

Our invention further consists in combining with a cane-carrying cart a vertically-adjustable platform or platforms, located at the front or rear, or at both ends, and also in combining with the tongue of the cart a furrow-cleaner and a novel construction of the whiffletrees, all of which will be fully and clearly hereinafter shown, described, and claimed, by reference to the accompanying drawings, in which—

Figure 1 is a side elevation of the cart or vehicle complete, showing a similar view of the front and rear platforms. Fig. 2 is a plan or top view of the cart complete. Fig. 3 is an enlarged cross-section through the shaft, showing a portion of the tongue-frame and the manner of its attachment to the frame. Fig. 4 is a plan or top view of the frame-work of the cart, showing also a similar view of the whiffletrees and their construction. Fig. 5 is a rear end view of the cart and rear platforms. Fig. 6 is an enlarged side elevation of a portion of the cart and one of the adjustable platforms, showing more clearly its construction; and Fig. 7 represents an enlarged view of the under side of the furrow-cleaning device, showing a plan of the furrow-cleaning blades.

In the said drawings, 1 represents the body of the cart. It is constructed so that the upper part of the sides 2 project out over the wheels, so as to broaden the cart at the top and increase its capacity. The sides are strengthened by iron braces 3.

The cart-frame or bottom frame consists of the beams 4, 5, 6, 7, 8, and 9, (see Fig. 4,) and is secured together in the well-known way. The bottom is formed by the covering-boards 10. (Shown in Fig. 2.) The wheels 11 are made and secured to the axle 12 in the ordinary way.

The open-frame tongue consists of the bars 13 14, having their ends pivoted by pins 15 to the side frame-bars, 5 and 6, by pins. (Shown in Figs. 3 and 4.) The opposite ends of these bars 13 and 14 come nearly together and are secured to the tongue-piece 16 by bolts 17 and 18. This construction of the tongue leaves an open space, 19, through which the cane, in long or full-length pieces, is passed and placed into the furrow as the vehicle is moving along. The forward end of the tongue is provided with the usual clevis, 21.

22 represents the furrow-cleaning device. It is connected to a curved bar, 23, pivoted by a pin or bolt, 24, to the forward end of the tongue. The under side of the furrow-cleaning device is provided with several series of plates, 25 26 27 28, made of about three-eighths thick iron, more or less, and the plates are placed sufficiently far apart to prevent filling up with dirt, and each series is placed a short distance to one side of the other series, as shown. The action of this device is something like a harrow. It breaks and softens the soil just as the cane is being put into the furrow, besides it serves to clean out the furrow by removing stones and breaking the lumps of earth that may lie in it.

The double-tree 29 is pivoted to the front bar or beam, 7, and is provided with two connecting-bars, 30, pivoted to each end by bolts 31. (See Fig. 4.) The opposite ends of the connecting-bars 30 are pivoted to or near the centers of the whiffletree-bars 32. One end of each of the bars 32 is pivoted to the open-frame tongue by bolts 33. (See Figs. 2 and 4.) The opposite ends of the whiffletree-bars are provided with whiffletrees 35 and 36, secured thereto in the usual well-known way. The object of this construction of the whiffletree-bars, their connecting-bars, and doubletree is to adapt them to be used on the open-frame tongue, where a space is left through which the cane to be planted is passed and put into the furrow, and also to permit the horses or mules to pull one against the other, as with the ordinary construction of the whiffletrees.

The back board of the cart is made in two pieces, 37 38. (See Fig. 5.) They are made easily removable, and are secured in place by stakes 39 and bolts and nuts 40, or in any well-known way. This construction of the back boards permits them to be more easily removed or put back in place than if made in one piece.

41 represents the platforms at the front of the vehicle, upon which the men stand or sit while taking the cane from the pile on the cart and passing it through the space within the open-tongue frame and placing it in the furrow. This platform (or platforms, as there may be one or two, as may be desired, or according to the capacity of the machine) is hung upon the arms 42, pivoted thereto by pins 43 and suspended upon the pins 44. There are four of the arms 42 for suspending each platform. The upper ends of these arms are pivoted to the cross-bars 45, which bars are rigidly secured to the open-frame tongue. The rear platform or platforms, 50, are also suspended by arms 42 in a similar way. To the lower end of one of the front arms of each of the platforms is pivoted a slotted bar, 20, (see Fig. 6,) and its opposite end is secured by a bolt, 46, which passes through the slot 47 in the arm and into the upper end of the back arm. This construction allows the platform to be adjusted vertically up or down, as shown by the dotted lines 48 in said Fig. 6, and secured in such adjusted position by the set screw or bolt 46. Furthermore, if the platform should at any time strike any large obstruction with sufficient force, instead of breaking, the slotted bar 45 will move—that is, the slot in the bar will slip along the bolt 46, which operation would elevate the platform, instead of breaking it.

The wheels and other parts of the cart are of well-known construction and require no further description here.

We claim as our invention—

1. A cane-carrying cart, in combination with an open-frame cart-tongue, through which full-length sugar-cane can be dropped forward of the cart-body into a furrow for planting, as described.

2. In a cane-carrying cart, an open frame acting as a tongue to the cart, and provided with a platform or platforms on which the operators may stand or sit while removing cane from the cart and placing it in the furrow, as required for planting.

3. A cane-carrying cart having an open-frame cart-tongue provided with a platform or platforms for the operators to stand or sit upon while planting the cane in the furrow, in combination with one or more platforms at the rear of the cart-body, for the purposes described.

4. A cane-carrying cart having one or more removable platforms, from which the operators plant the cane in the furrows, substantially as specified, whereby the cart may be readily adapted for use as an ordinary cane-carrying cart or changed to a cane-planting machine, substantially as described.

5. In a cart for carrying cane or other purposes, the combination of the double-tree 29, the connecting-rods 30, pivoted to the ends of the double-tree and to the centers of the whiffletree-bars 32, one end of the whiffletree-bars being pivoted to the open-frame tongue, substantially as specified, and the whiffletrees to the free ends of the whiffletree-bars, as and for the purposes described.

6. A combined cart and sugar-cane planter provided with one or more platforms upon which the operators stand or sit while planting the cane, in combination with the pivoted swinging supporting-arms 42 and diagonally-arranged pivoted slotted bar 20, whereby the platform may be raised or lowered and is adapted to be moved back and up out of the way by an obstruction, substantially as described.

7. The combination, with the tongue of a combined cart and sugar-cane planter, of a furrow-cleaning device, consisting of the pivoted arms 23 and the plate 22, provided with the several series of plates 25, 26, 27, and 28, substantially as and for the purposes described.

EDWARD HOLMES.
BRITAIN HOLMES.

Witnesses:
JENNIE M. CALDWELL,
JAMES SANGSTER.